United States Patent [19]

Merritt

[11] Patent Number: 5,002,594
[45] Date of Patent: Mar. 26, 1991

[54] FILTER PULSE-DOWN CARTRIDGE CLEANING MECHANISM

[75] Inventor: Christopher R. Merritt, Indianapolis, Ind.

[73] Assignee: Ransburg Corporation, Indianapolis, Ind.

[21] Appl. No.: 565,163

[22] Filed: Aug. 13, 1990

Related U.S. Application Data

[63] Continuation-in-part of Ser. No. 401,180, Aug. 31, 1989, abandoned.

[51] Int. Cl.$^5$ .............................................. B01D 46/04
[52] U.S. Cl. .......................................... 55/302; 55/294
[58] Field of Search .......................... 55/294, 295, 302

[56] References Cited

U.S. PATENT DOCUMENTS

| | | | |
|---|---|---|---|
| 3,173,776 | 3/1965 | Palmore | 55/294 |
| 3,431,709 | 3/1969 | Kawanami | 55/302 |
| 3,498,030 | 3/1970 | Wilki | 55/302 |
| 3,626,674 | 12/1971 | Blackmore | 55/294 |
| 4,293,320 | 10/1981 | Robinson | 55/294 X |
| 4,645,520 | 2/1987 | Huttlin | 55/302 |

Primary Examiner—Charles Hart
Attorney, Agent, or Firm—Barnes & Thornburg

[57] ABSTRACT

A flow of gas entraining particulate material is passed through a filter having an upstream side and a downstream side, with the particulate material remaining on the upstream side while the gas flows to the downstream side. The downstream side exhausts through an opening into a plenum chamber wherein a second valve is provided for intermittently providing a cleaning gas flow in the reverse direction through the filter to remove particulate material from the upstream side. Cleaning gas under pressure is provided to the second valve, opening of the second valve permitting cleaning gas to flow therefrom. A first valve controls gas flow through the opening, the first valve operating in synchronism with the second valve substantially to stop flow through the filter from the upstream side to the downstream side when the second valve provides the cleaning gas flow. The first valve includes a cylindrical throat having a first end and a second end. The first end is coupled to the second valve to receive the intermittent cleaning gas flow therefrom. A seat is defined in the throat. A valve member has a head reciprocably slidably engaging the throat and captured between the first end and the seat, a valve closure portion, and a stem for coupling the valve closure portion to the valve head. The stem provides a cleaning gas passageway between the head and closure portion when the second valve is providing cleaning gas flow.

15 Claims, 3 Drawing Sheets

FILTER PULSE-DOWN CARTRIDGE CLEANING MECHANISM

This is a continuation-in-part of my earlier filed and copending U.S. Ser. No. 401,180 filed Aug. 31, 1989, now abandoned.

This invention relates to apparatus for the collection of airborne particulate material. It is disclosed in the context of apparatus for the collection of unused coating powders which either fail to strike, or fail to adhere to, articles to be coated by such powders in powder coating installations. Although the invention is disclosed in this context, it is believed to be useful in other airborne particulate material collection processes as well.

Typically installations for the collection of unused coating powders include one or more powder collecting hoppers through which powder-laden air drawn from the vicinity of a powder dispensing apparatus is circulated and filtered, and the non-adherent powder is recovered from it. The hoppers typically are equipped with cartridge-type filters of accordion pleated paper or some other suitable filter medium. The recovered air is drawn through the filter medium, typically by a blower that sits on top of the hopper and is exposed to the insides of the filter cartridges. The non-adherent powder is deposited on the outside surfaces of the cartridges as the recovered air is drawn through them. If this process were to continue uninterrupted for a substantial time, the filters would load up and become ineffective because the air flow through them would be greatly reduced. As a consequence, it has become standard in the powder coating industry to clean the cartridges at appropriate time intervals. When the cartridges are cleaned, the powder falls from the filters to the bottom of the collection hopper, where it can be recovered and reused.

Usually this cleaning operation is conducted on the filters sequentially or according to some other appropriate control strategy. Ordinarily there are a sufficiently large number of filters associated with the hopper that cleaning any one of the filters at its appropriate time in the sequence does not noticeably disturb the steady state flow of powder-laden air into the recovery hopper. Consequently the sequential cleaning of the filters does not adversely affect the coating process which is being conducted.

There are at least two commonly known systems for cleaning powder recovery filters. One interrupts the flow of air through a filter by closing a valve on the blower side of the filter and then directing reverse air flows through multiple small jets movably positioned inside the filter to knock powder from the filter. The powder falls to the bottom of the hopper, where it can be recovered and reused.

Another common system pulses compressed air at appropriate time intervals down through the cartridges in the reverse direction to the normal airflow through them. This technique is normally called "pulsing down" the filters.

There are problems with these systems. With the former, a device for supporting the jets hangs down inside each filter cartridge. If different colors of powders are to be dispensed, a different hopper must be provided with each in any practical installation if color change is to be effected. This means that the blower, from which the jet-carrying hardware is suspended, must be raised relative to the powder hopper to get the two apart and permit another powder hopper supplying a different color of powder to be moved into use orientation under the blower.

The latter of these systems requires a high pressure pulse-down jet to be mounted near the outlet of each filter to provide the pulse of air necessary to blow the powder off its respective filter. As these systems are presently configured, they tend to be quite noisy, with the noise of the working pulse-down jets being in the 80-85 dB range.

According to the invention, a particulate material recovery system provides a flow of gas in which particulate material is entrained. The particulate material-laden gas is passed through a filter having an upstream side and a downstream side, with the particulate material remaining on the upstream side while the gas flows to the downstream side. The downstream side exhausts through an opening into a plenum chamber wherein the gas pressure is less than the gas pressure on the upstream side and wherein means are provided for intermittently providing a cleaning gas flow in the reverse direction through the filter to remove particulate material from the upstream side. A first valve controls gas flow through the opening. The first valve operates in synchronism with the means for intermittently providing a cleaning gas flow substantially to stop flow through the filter from the upstream side to the downstream side when the means for intermittently providing a cleaning gas flow provides such cleaning gas flow.

The invention may best be understood by referring to the following detailed description and accompanying drawings which illustrate the invention. In the drawings.

Figure 1:
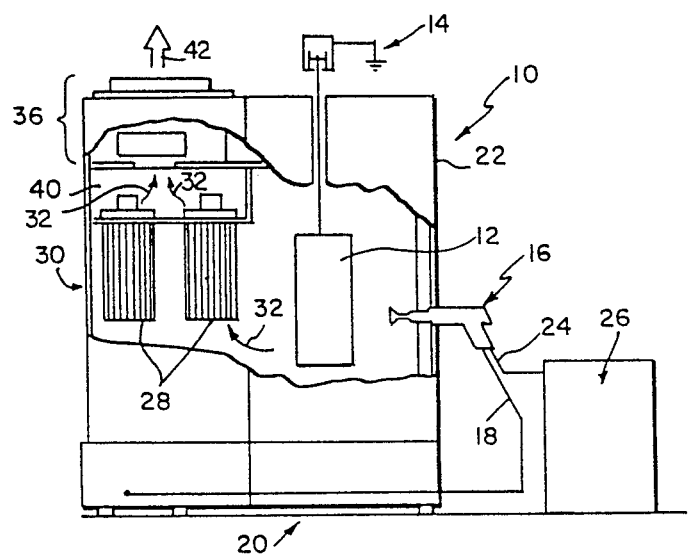
FIG. 1 illustrates a partly broken away end elevational view of a powder coating installation.

Referring to FIG. 1, a powder coating installation 10 for coating articles 12 suspended on a conveyor 14 is illustrated. The conveyor 14 conveys the articles 12 past powder dispensing devices or guns 16 which dispense coating powder entrained in an air stream supplied through a hose 18. The hose 18 receives the stream of airborne powder from a hopper 20 which is generally in the configuration of a fluidized bed forming a portion of the bottom of the cabinet or booth 22 in which the spray coating operation takes place. Typically the guns 16 electrically charge the airborne powder as it is dispensed. The electrical power for such charging is providing through a high voltage cable 24 from a high voltage source 26. A cartridge 28-type filter mechanism 30 is built into booth 22 and powder filtered from the air, arrows 32, flowing through booth 22 and cartridges 28 falls into hopper 20 and is fluidized and recirculated through hose 18 to gun 16.

Airflow 32 through the installation 10 is induced by a blower 36 which maintains a partial vacuum in a plenum chamber 40 above cartridges 28 and exhausts air 42 to atmosphere. In existing installations, owing to the cartridge 28 cleaning mechanisms of the prior art, the blower 36 and plenum chamber 40 are built into the booth 22. What this means is that a complete, separate installation must be provided for each color of powder which is to be dispensed, basically a separate complete coating application line for each color. This is practically necessary because the powders are very fine and penetrating and cannot be cleaned from the inside surfaces of the installation 10 during any color change interval of reasonably short duration. Since not all of the powder can be removed, the color can t be changed. Remaining powder of one color otherwise will contaminate a subsequently dispensed powder of a different color.

Figure 2:
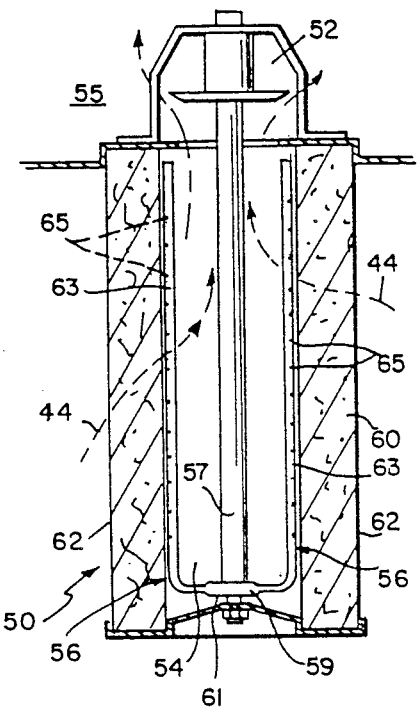
FIG. 2 illustrates a longitudinal sectional side elevational view of a detail of a prior art multiple jet system.

FIG. 2 illustrates the prior multiple jet-type cartridge cleaning system. During normal flow of the airstream 44 through a cartridge 50, a poppet valve 52 between the interior 54 of the cartridge 50 and the plenum chamber 55 remains open. The jet-supporting yoke 56 remains stationary. When the signal for cleaning of cartridge 50 occurs, the poppet valve 52 closes, interrupting airflow through cartridge 50. Air under pressure is supplied down a central, air supply pipe 57 and through a swivel air coupler 59 at the bottom end 61 thereof to the two diametrically opposed arms 63 of the yoke 56. Forcing of this air through the jets 65 of arms 63 causes yoke 56 to rotate, since both sets of jets 65 have tangential components to their orientations and the jets 65 in one arm 63 are directed oppositely to the jets 65 in the other arm 63. The blasts of air from jets 65 also have components into the filter medium 60, blowing adherent powder from the outside surfaces 62 of the cartridge 50. It is evident that one set of this hardware 52, 56 is required for each of the cartridges 50. It is also evident that because of the depth to which pipes 57 and yokes 56 protrude into the interiors of the cartridges 50, it is relatively impractical to provide a modular system in which a single blower/plenum chamber combination could be provided for selective association with any number of different booth/hopper combinations, each dedicated to spraying a different color of powder. Such a system would require a mechanism for jacking the blower/plenum chamber combination up quite high so that the yokes 56 and their associated hardware can clear the vertically upper ends of their respective cartridges 50.

Figure 3:
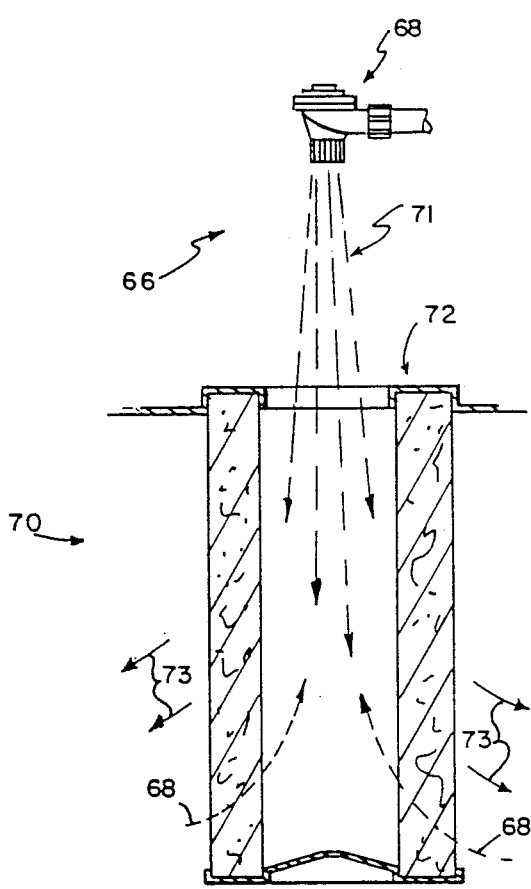
FIG. 3 illustrates a longitudinal sectional side elevational view of a detail of a prior art pulse-down type system.

The filter pulse-down jet system 66 illustrated in FIG. 3 avoids the problems of interference between the blower/plenum chamber portion of a powder installation and the booth/hopper portion of the installation. The operation of these systems is straightforward. The ordinary airflow 68 through the cartridges 70 of these systems is interrupted, usually in an established sequence, by reverse blasts 71 of air provided by individual jets 68 mounted above the downstream ends 72 of the respective individual cartridges 70. These blasts 71 generate sufficient reverse flow 73 through their respective cartridges 70 to flush or knock adherent powder from them into the recovery hopper. However, there is an attendant cost. Jet systems 66 are noisy, often providing noise levels in the 80-85 dB range near the powder coating installation when the jets 68 of these systems are operating.

Figure 4:
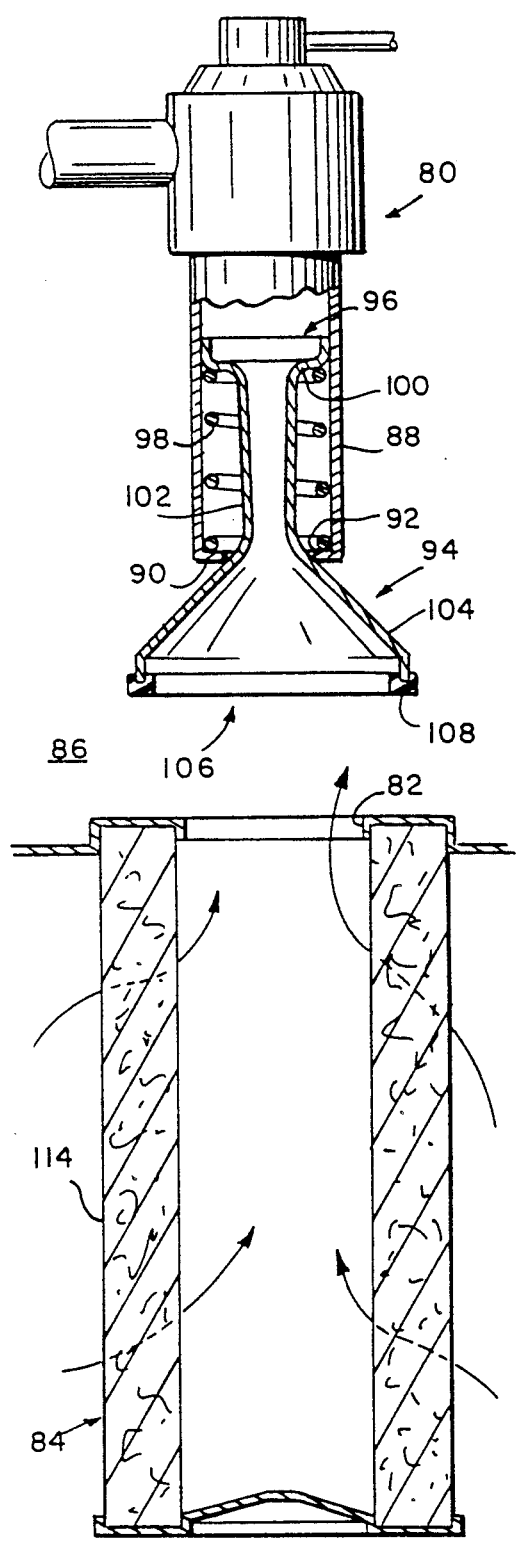
FIG. 4 illustrates a partly fragmentary, much-enlarged longitudinal sectional side elevational view of a detail of a system constructed according to an embodiment of the present invention in its non-filter cleaning orientation.
Figure 5:
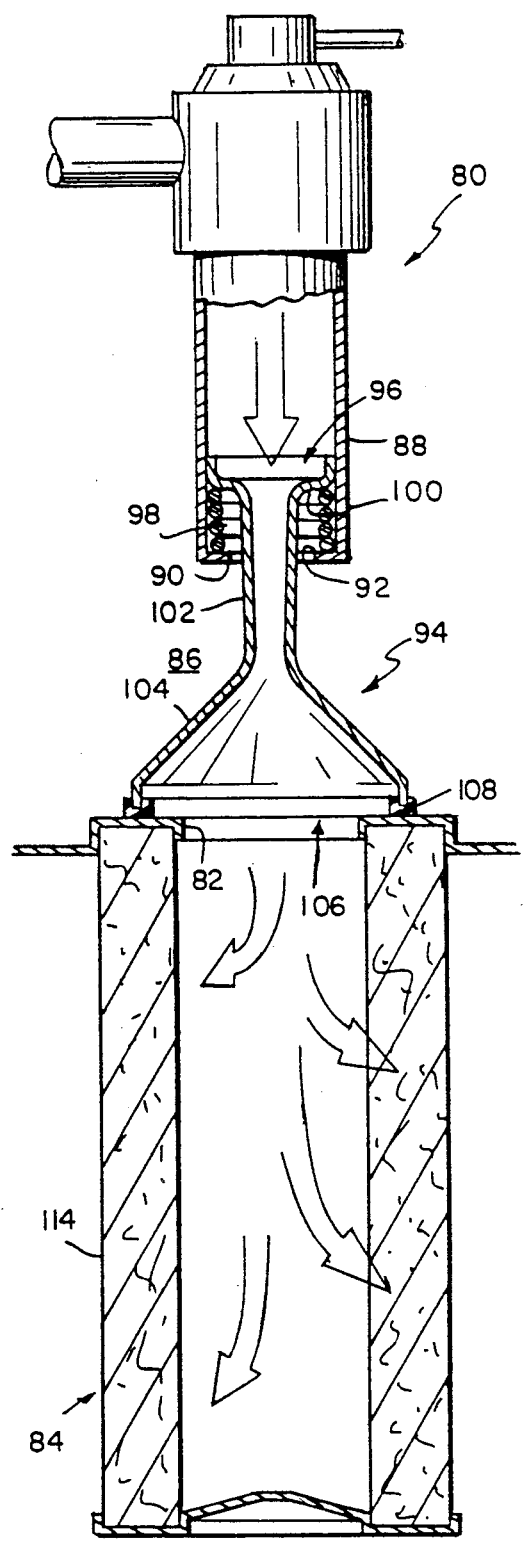
FIG. 5 illustrates a partly fragmentary, much-enlarged longitudinal sectional side elevational view of a detail of a system constructed according to an embodiment of the present invention in its filter cleaning orientation.

The present invention can best be understood by referring to FIGS. 4-5. A jet 80 of the same general configuration as jets 68 is suspended above the downstream opening 82 of each cartridge 84 into the plenum chamber 86. Each jet 80 is provided with an extended tubular throat 88. The vertically lower end 90 of each throat is formed to provide a spring seat 92. A hollow valve member 94 has a somewhat piston shaped head 96 reciprocably slidable in throat 88. A compression return spring 98 is captured between the underside 100 of head 96 and spring seat 92.

Valve member 94 includes a hollow stem portion 102 which flares to a funnel-shaped bottom 104. The downwardly opening mouth 106 of bottom 104 is provided with an elastomeric gasket 108 and is sized to engage and close the upwardly opening downstream end 82 of its respective cartridge 84 when the valve member 94 is moved into its use orientation illustrated in FIG. 5.

The spring constant of spring 98 is such that, when the blast or jet of air is introduced by jet 80 into throat 88, it acts against the inside surfaces of piston-shaped head 96 to urge it downward, overcoming the spring 98's natural restoring force. The spring 98 is deflected sufficiently by this jet of air that gasket 108 substantially seals the top opening 82 of cartridge 84, directing substantially the entire jet of air into it. This effectively blows powder previously deposited on the outside surfaces 114 of cartridge 84 from these surfaces. This powder is returned by gravity to the hopper for fluidization and recirculation to the powder dispensing gun(s).

At the end of the cartridge 84 pulse-down cleaning interval, the jet 80 is closed, terminating the flow of air into throat 88. Spring 98 returns valve member 94 to its position illustrated in FIG. 4 and the steady state upward flow of powder-laden air is reestablished, with the powder being removed from the airflow being deposited on the outside surfaces 114 of cartridge 84.

The system illustrated in FIGS. 4-5 provides a benefit not available with prior art rotary-jet systems such as the one illustrated in FIG. 2. Referring to FIGS. 2, 4 and 5, it will be appreciated that the mechanism 56 extends downward into the cartridge 50 the full length of the cartridge. Thus, if a modular system in which a separate blower/plenum chamber and multiple booth/hopper structures for different colors of powder is provided, some mechanism must be provided for jacking the blower/plenum chamber up so that the mechanisms 56 can clear their respective cartridges in order to move the booth/hopper out from under the blower/plenum chamber and another booth/hopper containing a different color powder under the blower/plenum chamber. With the present invention, on the other hand, the springs 98 lift all of the valve members 94 clear of the booth/hopper, as illustrated in FIG. 4, and there is no mechanism that extends downward from the blower/plenum chamber into the cartridges. This makes removal of one booth/hopper from under the blower/- plenum chamber and replacement of the booth/hopper by another one providing a different color powder a much simpler operation.

The system illustrated in FIGS. 4–5 also provides a benefit not available with prior art jet pulse down systems of the type illustrated in FIG. 3. As can best be appreciated by referring to FIG. 3, the jet 68 nozzles are open within the plenum chamber. This means that the only shielding for the noise created when the jets 68 operate is the typically sheet metal wall of the plenum chamber. As a result, the operation of the jets 68 is quite noisy. In addition, the amount of noise created by the jets 68 when they operate is related to the amount of air they require to pulse down their respective cartridges 70 effectively. Since the jets 68 are not constrained to deliver their air only to their respective cartridges 70, considerable air must be delivered during each pulse-down. This translates into considerable noise. With the present invention on the other hand, practically all of the air delivered by any jet 80 during pulse-down is directed by that jet 80's respective valve member 94 into its respective cartridge 84. This permits a substantial reduction in the amount of air required to pulse the cartridge 84 down effectively. Reducing the required pulse-down air results in a reduction in operating noise. In addition, the valve member 94 itself constitutes additional noise shielding between the jets 80 and persons in the vicinity of the coating booth.

Figure 6:
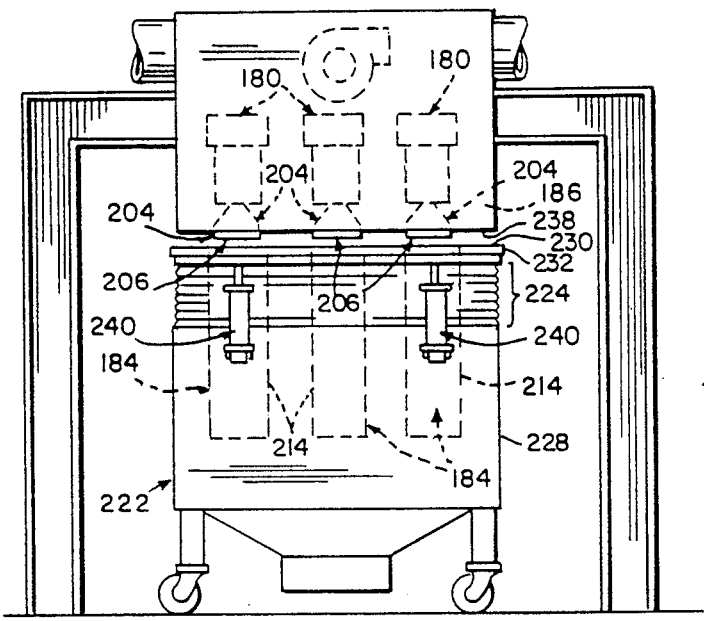
FIG. 6 illustrates a partly broken away side elevational view of a powder coating installation constructed according to the present invention.
Figures 7, 8:
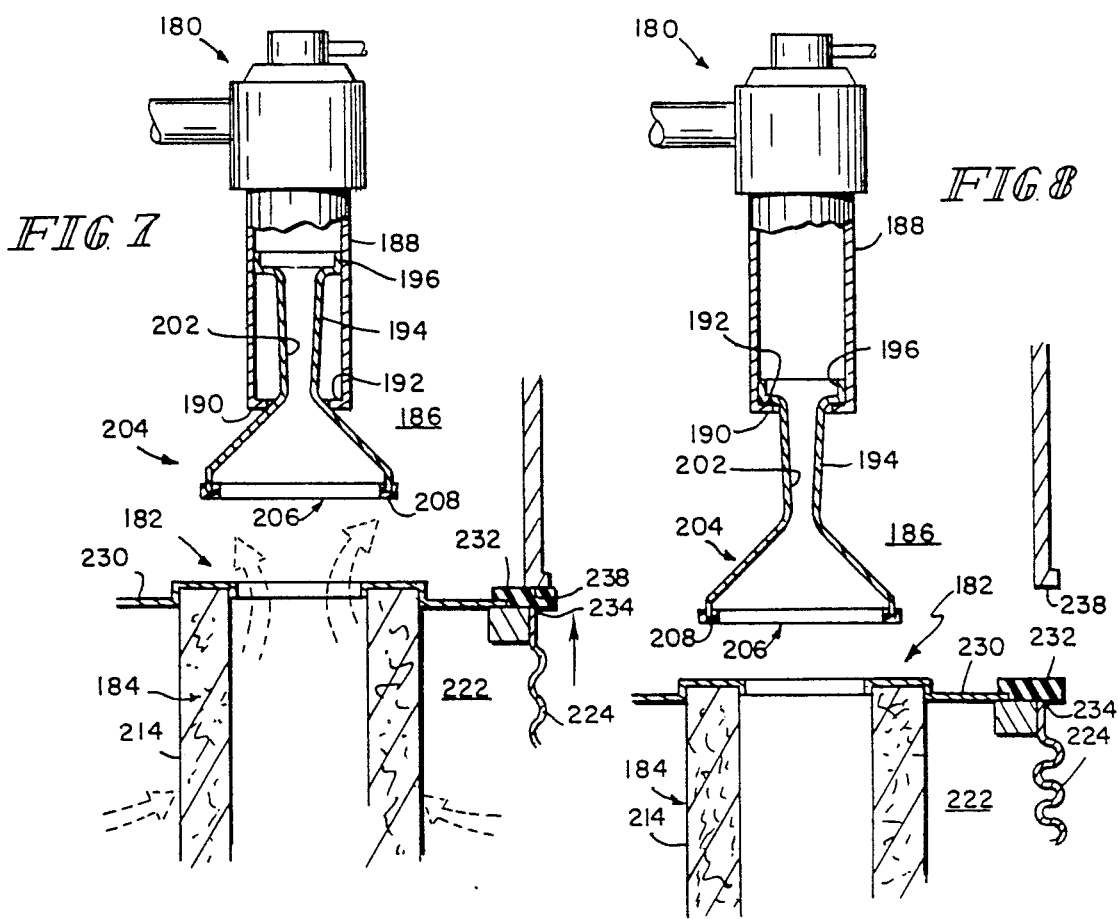
FIG. 7 illustrates a partly fragmentary, much enlarged longitudinal sectional side elevational view of a detail of a system constructed according to the embodiment of FIG. 6 in its non-filter cleaning orientation; and, FIG. 8 illustrates a partly fragmentary, much enlarged longitudinal sectional side elevational view of the detail of FIG. 7 in its booth/hopper removal and replacement orientation.

Turning to another embodiment of the system of the present invention illustrated in FIGS. 6–8, a jet 180 of the same general configuration as jets 68 is suspended above the downstream opening 182 of each cartridge 184 into the plenum chamber 186. Each jet 180 is provided with an extended tubular throat 188. The vertically lower end 190 of each throat is formed to provide a valve retainer 192. A hollow valve member 194 has a somewhat piston-shaped head 196 reciprocably slidable in throat 188. Valve member 194 is thereby captured by valve retainer 192.

Valve member 194 includes a hollow stem portion 202 which flares to a funnel shaped bottom 204. The downwardly opening mouth 206 of bottom 204 is provided with an elastomeric gasket 208 and is sized to engage and close the upwardly opening downstream end 182 of its respective cartridge 184 when the valve member 194 is moved into its use orientation, similar to that illustrated in FIG. 5.

In the embodiment of FIGS. 6–8, the airflow through openings 182 is sufficient to force their respective valve members 194 upward and hold them up until the blast or jet of air is introduced by jet 180 into throat 188. This blast or jet of air acts against the inside surfaces of piston-shaped head 196 to urge it downward, overcoming the upward force provided by the air moving upward through a respective opening 182. Gasket 208 substantially seals the top opening 182 of a respective cartridge 184, directing substantially the entire jet of air into it. This effectively blows powder previously deposited on the outside surfaces 214 of the respective cartridge 184 from these surfaces. This powder is returned by gravity to the hopper for fluidization and recirculation to the powder dispensing gun(s).

At the end of the cartridge 184 pulse down cleaning interval, the jet 180 is closed, terminating the flow of air into throat 188. The upward flow of air through opening 182 is reestablished, and is sufficient, absent the downward pressure provided by jet 180, to return valve member 194 to its position illustrated in FIG. 7. The steady state upward flow of powder-laden air is reestablished, with the powder being removed from the airflow being deposited on the outside surfaces 214 of cartridge 184.

In order to provide the system of FIGS. 6–8 with the flexibility to be used in a modular system in which a separate blower/plenum chamber 186 and multiple booth/hopper structures 222 for different colors of powder are provided, an accordion-pleated or bellows-like top wall structure 224 is provided on each booth/hopper 222. This structure 224 permits the user to move the booth/hopper 222 out from under the blower/plenum chamber 186 and another booth/hopper 222 containing a different color powder under the blower/plenum chamber 186. According to this embodiment, the top few inches of the upper extents of the side walls 228 of each booth/hopper 222 are provided by the accordion-pleated structure 224. The top of the structure 224 is closed by the plate 230, called the "tube sheet", which supports the filter cartridges 184. A sealing gasket 232 is provided around the edge 234 of the tube sheet 230, so that when the structure 224 is projected upward into contact with the bottom edge 238 of the blower/plenum chamber 186, the tube sheet 230 is sealed to the blower/plenum chamber 186. Structure 224 extends upward to a height controlled by air cylinders 240 which are oriented around the walls 228 of the booth/hopper 222 and extend between walls 228 and the tube sheet 230.

It is clear that when the structure 224 is retracted downwardly, the seal between the booth/hopper 222 and the blower/plenum chamber 186 is broken. Under this circumstance, there is not enough airflow past valve members 194 to maintain them in their retracted orientations similar to the orientation of valve member 94 in FIG. 4. The valve members 194 would thus hang down and interfere with the removal and replacement of booth/hopper 222 with another booth/hopper 222 providing another color of powder, were it not for the accordion-pleated structure 224. To replace the booth/hopper 222 with another booth/hopper 222 for dispensing another color, the air cylinders 240 are actuated to retract the structure 224 and tube plate 230 from the bottom edge 238 of the blower/plenum chamber 186. Of course, the valve members 194 immediately fall into their orientations illustrated in FIG. 8. However, the retraction of structure 224 insures that there will be no interference between the valve members 194 and the structure 224 during removal of the booth/hopper 222 from beneath the blower/plenum chamber 186 and replacement of it with another booth/hopper 222 for coating with a powder of a different color. When the replacement booth/hopper 222 is in place, its air cylinders 240 are actuated to project its structure 224 and tube plate 230 upward into sealing engagement with the lower edge 238 of the blower/plenum chamber 186, and coating with the replacement color of powder can begin.

The system illustrated in FIGS. 6 8 also provides the benefits of shielding workers in the vicinity of the apparatus somewhat better from noise during the pulse-down operation, and of the reduced pulse down air requirement. As previously mentioned, reduction of the amount and/or pressure requirements for pulse-down reduces plant cost and further reduces noise.

What is claimed is:

1. In a particulate material recovery system wherein a flow of gas entraining particulate material is passed through a filter having an upstream side and a downstream side with the particulate material remaining on the upstream side while the gas flows to the downstream side, and wherein the downstream side exhausts through an opening into a plenum chamber wherein the gas pressure is less than the gas pressure on the upstream side and wherein a second valve is provided for intermittently providing a cleaning gas flow in the reverse direction through the filter to remove particulate material from the upstream side, means for providing cleaning gas under pressure to the second valve, opening of the second valve permitting cleaning gas to flow therefrom, the improvement comprising a first valve for controlling gas flow through the opening, the first valve operating in synchronism with the second valve substantially to stop flow through the filter from the upstream side to the downstream side when the second valve provides such cleaning gas flow, the first valve including a cylindrical throat having a first end and a second end, the first end coupled to the second valve to receive the intermittent cleaning gas flow therefrom, means defining in the throat a seat, a valve member having a head reciprocably slidably engaging the throat and captured between the first end and the seat, the valve member further comprising a valve closure portion and a stem for coupling the valve closure portion to the valve head, the stem providing a cleaning gas passageway between the head and closure portion when the second valve is providing cleaning gas flow.

2. The apparatus of claim 1 and further comprising a spring for urging the head toward the first end, the spring captured between the seat and the head.

3. The apparatus of claim 2 wherein the head is configured to respond to gas flow through the second valve to move the valve closure portion into engagement with the opening and to respond to the restoring force of the spring when gas flow through the second valve is terminated.

4. The apparatus of claim 2 wherein the valve closure portion includes means defining a mouth configured to close the opening, the first valve further comprising a gasket for substantially sealing the mouth against the opening when the mouth engages the opening, the gasket surrounding, and supported by, the mouth.

5. The apparatus of claim 1 wherein the valve closure portion is so configured that flow through the filter from the upstream side to the downstream side is sufficient, absent cleaning gas flow, to bias the head toward the first end of the throat and away from the seat.

6. The apparatus of claim 5 wherein the opening is provided in a plate, and further comprising means for movably mounting the plate for selective movement toward and away from the plenum chamber.

7. The apparatus of claim 6 comprising a particulate material collector hopper having one or more walls, and means for joining the walls to the plate, the means for joining the walls to the plate comprising a bellows- or accordion-pleated section between each wall and the plate, the means for movably mounting the plate selectively projecting the plate toward the plenum chamber and retracting the plate away from the plenum chamber by unfolding and folding, respectively, the bellows- or accordion-pleated section.

8. The apparatus of claim 7 wherein the means for movably mounting the plate to the wall further comprises one or more fluid motors coupled to the wall and to the plate, actuation of the fluid motor(s) in a first direction moving the plate toward the plenum chamber and actuation of the fluid motor(s) in a second direction moving the plate away from the plenum chamber.

9. The apparatus of claim 8 wherein the plate and plenum chamber further include means for providing a seal therebetween when the plate is moved by the fluid motor(s) into engagement with the plenum chamber.

10. The apparatus of claim 1 wherein the valve closure portion comprises a funnel-shaped portion having a wide mouth and a narrow throat, the wide mouth covering the opening when the first valve is in its orientation stopping flow through the filter from the upstream side to the downstream side, the narrow throat of the funnel-shaped portion in fluid communication with the stem.

11. The apparatus of claim 10 wherein the valve closure portion is so configured that flow through the filter from the upstream side to the downstream side is sufficient, absent cleaning gas flow, to bias the head 12. The apparatus of claim 11 wherein the opening is provided in a plate, and further comprising means for movably mounting the plate for selective movement toward and away from the plenum chamber.

13. The apparatus of claim 12 comprising a particulate material collector hopper having one or more walls, and means for joining the walls to the plate, the means for joining the walls to the plate comprising a bellows- or accordion-pleated section between each wall and the plate, the means for movably mounting the plate selectively projecting the plate toward the plenum chamber and retracting the plate away from the plenum chamber by unfolding and folding, respectively, the bellows- or accordion-pleated section.

14. The apparatus of claim 13 wherein the means for movably mounting the plate to the wall further comprises one or more fluid motors coupled to the wall and to the plate, actuation of the fluid motor(s) in a first direction moving the plate toward the plenum chamber and actuation of the fluid motor(s) in a second direction moving the plate away from the plenum chamber.

15. The apparatus of claim 14 wherein the plate and plenum chamber further include means for providing a seal therebetween when the plate is moved by the fluid motor(s) into engagement with the plenum chamber.

* * * * *

UNITED STATES PATENT AND TRADEMARK OFFICE
CERTIFICATE OF CORRECTION

PATENT NO.   : 5,002,594

DATED        : March 26, 1991

INVENTOR(S)  : Christopher R. Merritt

It is certified that error appears in the above-identified patent and that said Letters Patent is hereby corrected as shown below:

In column 8, line 30, after "head", please insert --toward the first end of the throat and away from the seat.--

Signed and Sealed this

Fifteenth Day of September, 1992

Attest:

DOUGLAS B. COMER

*Attesting Officer*     Acting Commissioner of Patents and Trademarks